United States Patent
D'Amato et al.

(10) Patent No.: US 9,616,898 B2
(45) Date of Patent: Apr. 11, 2017

(54) SYSTEM AND METHOD FOR DETERMINING EFFECTIVE ROAD GRADE CHARACTERISTIC

(71) Applicant: Ford Global Technologies, LLC, Dearborn, MI (US)

(72) Inventors: Anthony Mario D'Amato, Canton, MI (US); Jonathan Thomas Mullen, Lexington, KY (US); John Ottavio Michelini, Sterling Heights, MI (US); Steven Joseph Szwabowski, Northville, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/252,193

(22) Filed: Apr. 14, 2014

(65) Prior Publication Data
US 2015/0166073 A1 Jun. 18, 2015

Related U.S. Application Data

(60) Provisional application No. 61/915,365, filed on Dec. 12, 2013.

(51) Int. Cl.
*B60W 40/076* (2012.01)
(52) U.S. Cl.
CPC ....... *B60W 40/076* (2013.01); *B60W 2520/10* (2013.01); *B60W 2520/105* (2013.01);
(Continued)
(58) Field of Classification Search
USPC .......................................................... 701/1
See application file for complete search history.

(56) References Cited

U.S. PATENT DOCUMENTS 6,076,032 A * 6/2000 Kuroda ................. B60W 30/18
477/97
6,161,071 A * 12/2000 Shuman ............. B60K 31/0008
340/436
(Continued)

FOREIGN PATENT DOCUMENTS

JP 60070307 4/1985
JP 2001123860 5/2001
JP 2013124031 6/2013

OTHER PUBLICATIONS

McDonough, Kevin, et al., Modeling of Vehicle Driving Conditions Using Transition Probability Models, IEEE, Control Applications (CCA), 2011 IEEE International Conference, pp. 544-549, Sep. 28-30, 2011.*

(Continued)

*Primary Examiner* — Jean-Paul Cass
(74) *Attorney, Agent, or Firm* — Frank A. MacKenzie; Bejin Bieneman PLC

(57) ABSTRACT

A vehicle system includes a computer in a vehicle, and the computer includes a processor and a memory. The computer is configured to determine an operational state of a vehicle, calculate a road grade value from data from a first sensor, calculate an effective road grade value from a torque demand value, update modeling variables to map the road grade value substantially to the effective grade value when the operation state is determined to be a steady-state condition, and calculate a road grade characteristic with the road grade value and the modeling variables.

15 Claims, 2 Drawing Sheets

(52) U.S. Cl.
CPC ... *B60W 2540/10* (2013.01); *B60W 2550/142* (2013.01); *B60W 2550/402* (2013.01)

(56) References Cited

U.S. PATENT DOCUMENTS

| | | | |
|---|---|---|---|
| 6,374,173 B1 | 4/2002 | Ehlbeck | |
| 9,200,898 B2* | 12/2015 | Nilsson | B60T 8/172 |
| 2004/0034460 A1* | 2/2004 | Folkerts | B60W 30/188 |
| | | | 701/54 |
| 2005/0149240 A1* | 7/2005 | Tseng | B60G 17/016 |
| | | | 701/38 |
| 2006/0293841 A1* | 12/2006 | Hrovat | B60T 8/172 |
| | | | 701/466 |
| 2007/0225886 A1* | 9/2007 | Morris | B60K 6/365 |
| | | | 701/51 |
| 2009/0111642 A1* | 4/2009 | Sah | B60K 6/445 |
| | | | 477/5 |
| 2009/0118914 A1* | 5/2009 | Schwenke | B60K 6/445 |
| | | | 701/51 |
| 2010/0004848 A1 | 1/2010 | Transou, Jr. | |
| 2010/0087996 A1* | 4/2010 | Haggerty | B60K 6/445 |
| | | | 701/58 |
| 2010/0114424 A1* | 5/2010 | Morris | B60W 30/20 |
| | | | 701/51 |
| 2010/0138107 A1* | 6/2010 | Morris | B60K 6/445 |
| | | | 701/36 |
| 2011/0087398 A1* | 4/2011 | Lu | B60G 17/0165 |
| | | | 701/31.4 |
| 2011/0166757 A1* | 7/2011 | Otanez | B60W 50/06 |
| | | | 701/60 |
| 2011/0190972 A1* | 8/2011 | Timmons | G01C 21/34 |
| | | | 701/31.4 |
| 2011/0251748 A1* | 10/2011 | Moran | B60T 8/1755 |
| | | | 701/31.4 |
| 2011/0276216 A1 | 11/2011 | Vaughan | |
| 2013/0226420 A1 | 8/2013 | Pedlar et al. | |
| 2014/0067154 A1* | 3/2014 | Yu | B60W 40/076 |
| | | | 701/1 |
| 2014/0067155 A1* | 3/2014 | Yu | B60W 40/13 |
| | | | 701/1 |
| 2014/0067240 A1* | 3/2014 | Yu | B60W 40/13 |
| | | | 701/112 |
| 2014/0121902 A1* | 5/2014 | Moran | B60T 8/1755 |
| | | | 701/37 |
| 2014/0172252 A1* | 6/2014 | Siegel | F16H 61/00 |
| | | | 701/55 |
| 2014/0172256 A1* | 6/2014 | Landes | F16H 61/21 |
| | | | 701/65 |
| 2014/0200788 A1 | 7/2014 | Eriksson et al. | |
| 2014/0236448 A1 | 8/2014 | Eriksson et al. | |
| 2014/0243152 A1* | 8/2014 | Gibson | B60W 10/06 |
| | | | 477/185 |
| 2014/0244130 A1* | 8/2014 | Filev | B60K 31/00 |
| | | | 701/96 |
| 2014/0336890 A1* | 11/2014 | Kresse | F16H 61/68 |
| | | | 701/60 |
| 2015/0165905 A1* | 6/2015 | Filev | B60K 31/00 |
| | | | 701/94 |
| 2015/0166073 A1* | 6/2015 | D'Amato | B60W 40/076 |
| | | | 701/1 |

OTHER PUBLICATIONS

T. Massel, et al., "Investigation of different techniques for determining the road uphill gradient and the pitch angle of vehicles", Proceeding of the 2004 American Control Conference, Boston, Massachusetts, Jun. 30-Jul. 2, 2004, 6 pages.

Non-Final Office Action dated Oct. 6, 2015; U.S. Appl. No. 14/567,227; 19 pages.

* cited by examiner

SYSTEM AND METHOD FOR DETERMINING EFFECTIVE ROAD GRADE CHARACTERISTIC

CROSS-REFERENCE TO RELATED APPLICATION

This application claims priority to U.S. Provisional Patent Appl. No. 61/915,365, filed Dec. 12, 2013 entitled "Rule Based Smart Cruise Control", the complete contents of which is hereby incorporated herein by reference in its entirety.

BACKGROUND

Vehicle control operations, such as automobile cruise control, may depend upon environmental conditions and related forces affecting the motion of the vehicle. For example, road grade is an environmental condition that may oppose or promote the longitudinal motion of a vehicle, and, therefore, a control operation such as cruise control may adjust according to the resultant effect from a particular road grade on the vehicle. Other conditions that may affect the motion of a vehicle, alone or in combination with road grade and each other, include forces acting on the vehicle from headwinds, changes in vehicle mass, and other aerodynamic effects. It is desirable, but currently difficult, for a vehicle control system to accurately and efficiently model a total of such forces acting on the vehicle.

DETAILED DESCRIPTION

Road grade is one of many conditions with associated forces that may oppose or promote the longitudinal motion of a vehicle. To account for unmeasured forces—such as headwinds, changes in vehicle mass, unknown aerodynamic effects, etc.—in addition to road grade, an effective road grade can be calculated or modeled. In applications such as cruise control, knowledge of the unknown resistive forces opposing vehicle motion are critical for velocity profile planning.

According to this disclosure, during steady-state power-on maneuvers, the effective grade can be computed from the difference between the measured, sensed or estimated torque and the known torque required to maintain the vehicle at steady-state on a flat road. During transient torque or power-off maneuvers, the force balance is non-zero, therefore, the effective grade cannot be efficiently computed from the estimated torque, e.g., such a calculation would require a much more complex model to capture all of the dynamic effects, that would, therefore, be relatively more susceptible to errors, and/or an estimate of vehicle acceleration through a relatively more complex computer operation, such as numerically differentiating the velocity of vehicle. According to this disclosure, road grade is also computed, during all conditions, through an accelerometer-based measurement, and the accelerometer-based road grade and the measured torque-based effective grade are both utilized through an online mapping or update of a road grade characteristic, this model is updated based on the effective grade calculation during steady-state, power on maneuvers.

Figure 1:
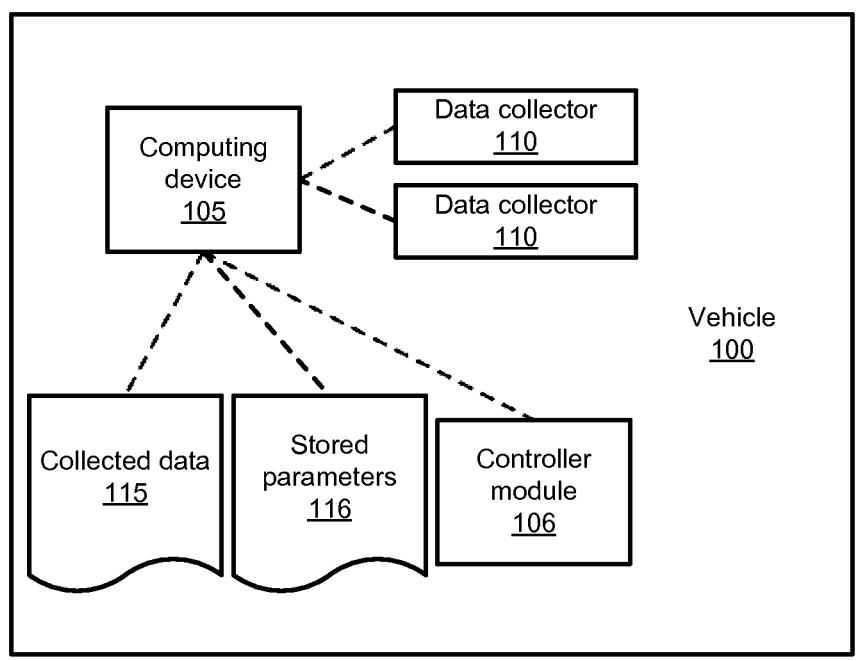
FIG. 1 illustrates an exemplary vehicle system for determining an effective road grade characteristic.

FIG. 1 schematically illustrates an exemplary vehicle 100. The exemplary system may take many different forms and include multiple and/or alternate components and facilities. It is to be understood that the exemplary components illustrated are not intended to be limiting, and that additional or alternative components and/or implementations may be used. For example, the vehicle 100 may be any passenger or commercial vehicle such as a car, a truck, sport-utility vehicle, a bus, train, a boat, or an airplane.

With further reference to FIG. 1, an exemplary vehicle 100 includes a vehicle computing device or computer 105 that generally includes a processor and a memory, the memory including one or more forms of computer-readable media, and storing instructions executable by the processor for performing various operations, including as disclosed herein. The computer 105 of the vehicle 100 receives information, e.g., collected data, from one or more data collectors 110 related to various components or conditions of the vehicle 100, e.g., components such as an accelerometer sensor system, a torque sensor system, a braking system, a steering system, a powertrain, etc., and/or conditions such as vehicle 100 torque demand, speed, acceleration, pitch, yaw, roll, etc. The computer 105 may include more than one computing device, e.g., controllers or the like included in the vehicle 100 for monitoring and/or controlling various vehicle components, e.g., a controller module 106, an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

Generally included in instructions stored in and executed by the computer 105 is a controller module 106. Using data received in the computer 105, e.g., from data collectors 110, data included as stored parameters 116, etc., the module 106 may control various vehicle 100 systems or equipment. For example, the module 106 may be used to accelerate, decelerate or maintain the velocity of vehicle 100, such as in conjunction with a cruise-control operation of vehicle 100.

Data collectors 110 may include a variety of devices. For example, various controllers in a vehicle may operate as data collectors 110 to provide data 115 via the CAN bus, e.g., data 115 relating to torque demand and/or output, vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include communication devices to send and receive information from other vehicles, such as path intentions from vehicles surrounding vehicle 100. Sensor data collectors 110 could include mechanisms such as RADAR, LADAR, sonar, etc. sensors that could be deployed to measure a distance between the vehicle 100 and other vehicles or objects. Yet other sensor data collectors 110 could include accelerometer sensors. In addition, data collectors 110 may include sensors to detect a position, change in position, rate of change in position, etc., of vehicle 100 components such as a steering wheel, brake pedal, accelerator, gearshift lever, etc.

A memory of the computer 105 generally stores collected data 115. Collected data 115 may include a variety of data collected in a vehicle 100. Examples of collected data 115 are provided above, and moreover, data 115 is generally collected using one or more data collectors 110, and may additionally include data calculated therefrom in the computer 105. In general, collected data 115 may include any data that may be gathered by a collection device 110 and/or computed from such data. Accordingly, collected data 115 could include a variety of data related to vehicle 100 operations and/or performance, data received from another vehicle, as well as data related to environmental conditions, road conditions, etc. relating to the vehicle 100. For example, collected data 115 could include data concerning a vehicle 100 torque demand, measured or sensed torque, position, speed, acceleration, pitch, yaw, roll, braking, presence or absence of precipitation, tire pressure, tire condition, etc.

A memory of the computer 105 may further store parameters 116. A parameter 116 generally governs control of a system or component of vehicle 100. These parameters may vary due to an environmental condition, road condition, vehicle 100 condition, or the like. For example, a parameter 116 may specify expected torque demands for vehicle 100 under certain conditions, e.g. a flat vehicle path, a certain vehicle weight or mass, to enable comparison of demanded or output torque during operation of vehicle 100 towards modeling or calculating the conditions in which vehicle 100 is operating.

As discussed in further detail below, the computer 105 and/or controller module 106 may compute or model an updated effective road grade characteristic, which can be stored as one of parameters 116, through an online mapping incorporating an accelerometer-based road grade calculation and, during steady-state and power-on maneuvers, a torque-based calculation of effective grade computed from the difference between the measured, sensed or estimated torque and the known torque required to maintain the vehicle at steady-state on a flat road, saved as a stored parameter 116. In one particular example, the effective road grade characteristic is determined by the computer 105 with the accelerometer-based road grade calculation and modeling variables or parameters, i.e. road grade characteristic model coefficients, each of which may be stored as part of parameters 116. In this example, the modeling variables, i.e. road grade characteristic model coefficients, are updated by the computer 105 during steady-state and power-on operating conditions of vehicle 100 according to the torque-based effective grade calculation, which may also be stored as one of parameters 116. The online update of the modeling variables is switched-off, or otherwise not performed, when the effective grade estimate is inaccurate, i.e. during transient maneuvers, and, therefore, the last update of the modeling variables is used to continue to determine the effective road grade characteristic, based on the accelerometer based grade calculation, during transient conditions. Updating the modeling variables allows the method to account for variation in the unmeasured forces over time. As such, according to this disclosure, the effective road grade characteristic may be calculated and updated throughout operation of vehicle 100, while including at least an estimate of the effective grade—and therefore the unmeasured forces affecting vehicle 100 in addition to the actual road grade itself—as well as avoiding relatively more complex derivative operations.

In one example implementation, the torque-based calculation of the computer 105 is identified where k is the time-step, m(k) is the vehicle mass, a(k) is the vehicle acceleration, T(k) is the torque demand, r is the effective radius, V(k) is the vehicle velocity, $P_{SS}(V(k))$ is the steady-state power required to maintain the vehicle velocity V(k), g is the acceleration due to gravity, $\delta_{true}(k)$ is the road grade and $F_u(k)$ is the sum of all unmeasured forces in the plane, e.g. head/tail winds. True road grade $\delta_{true}(k)$ can be obtained from the force balance in the forward path of a vehicle, specifically, the force balance is $$m(k)a(k) = \frac{T(k)}{r} + \frac{P_{ss}(V(k))}{V(k)} + m(k)g\sin(\delta_{true}(k)) + F_u(k). \quad (1)$$

In this exemplary implementation, with the range of road grade being small, the small angle theorem, namely, sin$(\delta_{true}(k)) \approx \delta_{true}(k)$ is applied; therefore equation (1) can be rewritten as $$m(k)a(k) = \frac{T(k)}{r} + \frac{P_{ss}(V(k))}{V(k)} + m(k)g\delta_{true}(k) + F_u(k). \quad (2)$$

The true road grade can be calculated by rearranging (2) as $$\delta_{true}(k) = -\frac{T(k)}{m(k)gr} - \frac{P_{ss}(V(k))}{V(k)} - F_u(k) + m(k)a(k). \quad (3)$$

Assuming a steady-state condition (m(k)a(k)=0), a nominal vehicle mass $m_n$, i.e. the curb weight and the standard occupant weight of vehicle 100 stored as one of parameters 116, and that $F_u(k)$ is unknown, equation (3) can be written in terms of effective grade $\delta_\tau(k)$ as, $$\delta_\tau(k) \triangleq -\frac{T(k)}{m_n gr} - \frac{P_{ss}(V(k))}{V(k)m_n g}. \quad (4)$$

Accordingly, the computer 105 and/or controller module 106 of the vehicle 100 computes an effective road grade characteristic as a function of the torque demand T(k), which is retrieved or estimated from collected data 115, values for $P_{SS}(V(k))$, V(k), $m_n$, g and r retrieved from collected data 115, saved as stored parameters 116, and/or derived from collected data 115 and/or parameters 116.

The effective grade equation (4) can be written as a sum of the true road grade and the unknown forces $F_u(k)$ modeled as grade $\bar{\delta}_{unmodeled}(k)$, specifically:

$$\delta_\tau(k) = \delta_{true}(k) + \bar{\delta}_{unmodeled}(k) \quad (5)$$

where $\bar{\delta}_{unmodeled}(k)$ is the effective road grade increase/decrease through $F_u(k)$ and the difference between m(k) and $m_n$, specifically, $$\bar{\delta}_{unmodeled}(k) = \left[\frac{1}{m(k)} - \frac{1}{m_n}\right]\left[\frac{T(k)}{gr} + \frac{P_{ss}(V(k))}{V(k)g}\right] + F_u(k). \quad (6)$$

As such, $F_u(k)$ and the true vehicle mass $m_n$ may be determined from the effective grade $\delta_\tau(k)$.

This exemplary method for computing $\delta_\tau(k)$ does not cover transient or power-off conditions of operation of vehicle 100, since the condition $m(k)a(k)=0$ is not applicable. In this exemplary implementation, the computer 105 and/or module 106 of vehicle 100 estimates an accelerometer-based grade $\delta_a(k)$, which is affine proportional to $\delta_{true}(k)$, through collected data 115 from an accelerometer sensor 110. However, this determination does not take into account any information about m or $F_u(k)$.

For example, to derive road grade from vehicle speed and longitudinal acceleration measurements among collected data 115, the accelerometer data in the longitudinal axis is integrated and compared to the true vehicle speed, and any difference between the values is proportional to grade. For a flat grade, the integral of the accelerometer data in the longitudinal axis is equal to the vehicle velocity. On uphill grades, since a component of acceleration due to gravity is opposing the forward acceleration of the vehicle, the integral of accelerometer data in the longitudinal axis will result in a velocity lower than the true vehicle speed. The difference is proportional to the road grade. For downhill grade, the integral of the sensor data will result in a higher vehicle speed estimate than the true vehicle speed since the component of gravity is acting in the same direction as the vehicle motion. Again the difference is proportional to the road grade. However, the true vehicle speed, and accelerometer data are unaffected by vehicle mass and unmodeled forces (e.g. wind); therefore such calculations of road grade are independent of such additional variables.

Accordingly, in this exemplary implementation, the corrected effective grade, or updated road grade characteristic, $\hat{\delta}_\tau(k)$ is defined as $$\hat{\delta}_\tau(k) \triangleq \alpha(k)\phi(k), \quad (7)$$

where the regressor $\phi \triangleq [1\ \delta_a(k)]^T$ and the model coefficients $\alpha(k) \triangleq [\alpha_0(k)\ \alpha_1(k)]$. As set forth below, according to this disclosure, the parameters a(k) are determined such that during the time intervals when $m(k)a(k)=0$, $\|\hat{\delta}_\tau(k)-\delta_\tau(k)\|$ is small. When $m(k)a(k)$ is nonzero, i.e. non steady state conditions, the mapping a(k) is not updated, and $\alpha(k)$ is updated when the vehicle is in steady-state.

In this example, the mapping update switch variable is $\beta(k) \in \{0, 1\}$. Specifically, $\beta(k)=1$ when $m(k)a(k)=0$. Furthermore, when $m(k)a(k)$ is not equal to zero, $\beta(k)=0$.

Next, $\alpha(k)$ is determined using, for example, recursive least squares, that is, $$\alpha(k) = \begin{cases} \alpha(k-1) + L(k)[\delta_\tau(k) - \alpha(k-1)\phi(k)], & \beta(k) = 1, \\ \alpha(k-1), & \beta(k) = 0, \end{cases} \quad (8)$$

where the variable L(k) is defined as:

$$L(k) \triangleq \frac{P(k-1)\phi(k)}{\lambda + \phi^T(k)P(k-1)\phi(k)}, \quad (9)$$

and $P(0) \in \mathbb{R}^{2 \times 2}$ is positive definite and $\lambda \in (0, 1]$ is the forgetting factor. When $\beta(k)=1$, the map is updated, whereas, when $\beta(k)=0$, the model is fixed. P(k) is updated by $$P(k) = \begin{cases} \frac{1}{\lambda}\left(P(k-1) - \frac{P(k-1)\phi(k)\phi^T(k)P(k-1)}{\lambda + \phi^T(k)P(k-1)\phi(k)}\right), & \beta(k) = 1, \\ P(k-1), & \beta(k) = 0, \end{cases} \quad (10)$$

where $$P(0) = \begin{bmatrix} \gamma_1 & 0 \\ 0 & \gamma_2 \end{bmatrix}, \text{ and } \gamma_1, \gamma_2 > 0. \quad (11)$$

Accordingly, as set forth in this example implementation, the vehicle 100 may utilize the computer 105 and/or controller module 106 to compute and update an effective road grade characteristic, based on an accelerometer-based road grade calculation and the existing mapping variables during transient and power-off conditions and, during steady-state and power-on maneuvers, incorporating a torque-based calculation of effective grade into the updated mapping variables. As such, according to this disclosure, the effective road grade may be calculated and updated throughout operation of vehicle 100 while avoiding potentially more complex derivative operations. It should be understood, that the particular calculations and models are exemplary. For example, the model may be updated using any least-squares method such as batch, or any method for solving a linear system of equations. Furthermore, in this implementation, the model was chosen to be a line. The model could be any structure which provides good residual error, for example, nonlinear (polynomial, radial basis, etc.), dynamic or both.

In general, computing systems and/or devices, such as the computer 105 and/or controller module 106 of the vehicle 100, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance. Examples of computing devices include, without limitation, a vehicle computer or control unit, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
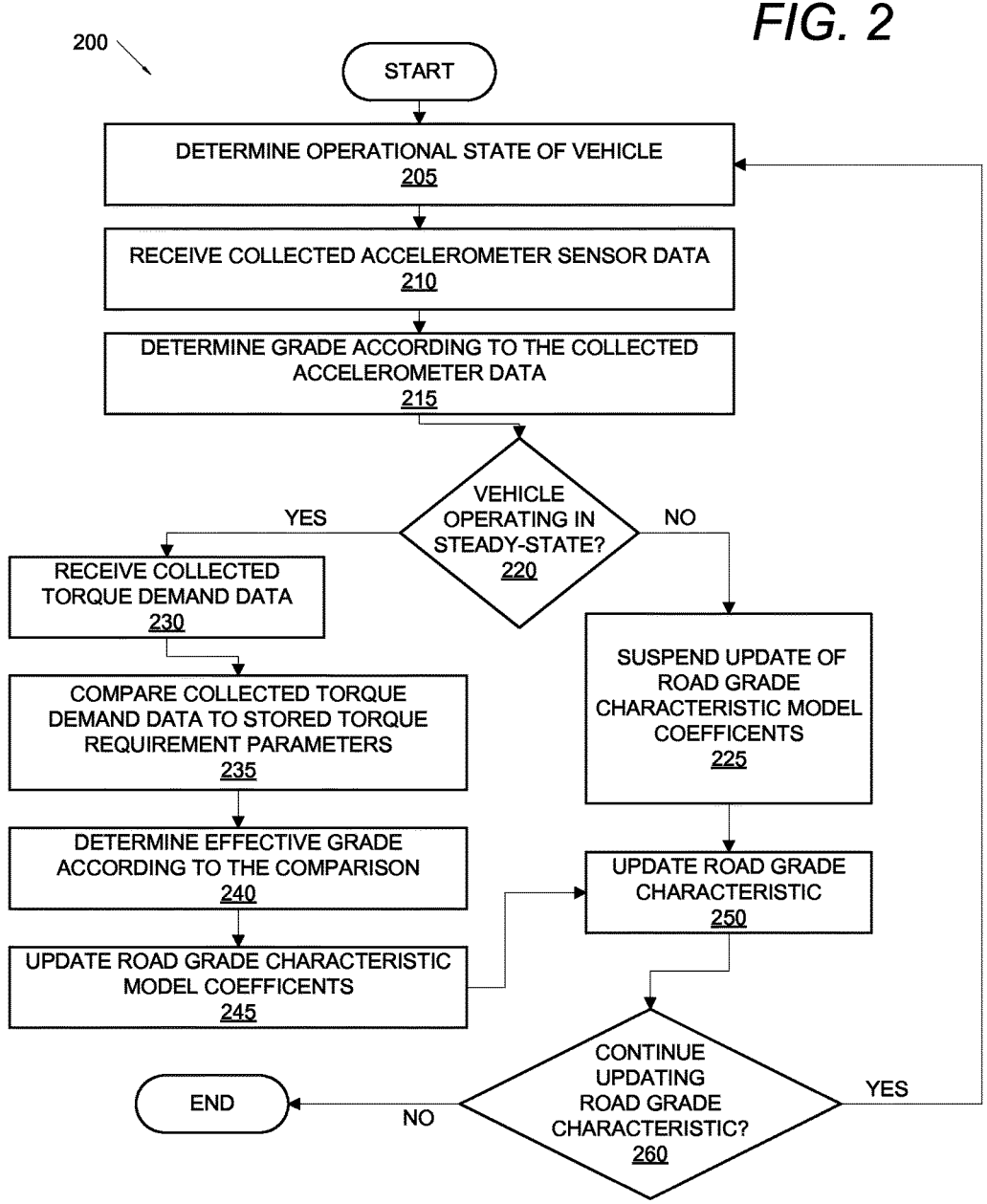
FIG. 2 is a flowchart of one exemplary process that may be implemented by the vehicle system.

FIG. 2 is a flowchart of an exemplary process 200 that may be implemented by the computer 105 and/or controller module 106 of the vehicle 100 to determine an updated effective road grade characteristic, stored among parameters 116, for use, e.g., in a cruise-control operation.

At a block 205, the vehicle 100 may receive information from one or more sensors 110, such as velocity of the vehicle 100, acceleration of the vehicle 100, towards determining the operational state of vehicle 100. At a block 210, the computer 105 may receive accelerometer sensor data from collected data 115. Next, at a block 215, the computer 105 may calculate road grade according to the accelerometer sensor data. For example, as set forth above, the road grade can be determined from the difference between the integral of the accelerometer data along the longitudinal axis of vehicle 100 and the true vehicle speed, which may be measured by one of the sensors 110. According to the information collected at the block 205, next, at a block 220, the computer 105 may determine whether the vehicle 100 is operating in a steady-state condition, i.e. maintaining a substantially constant velocity, or is otherwise in a transient condition, e.g. accelerating or decelerating.

If the vehicle 100 is not in a steady-state condition, at block 225, computer 105 skips or suspends updating of the modeling variables or road grade characteristic model coefficients, such as set forth in the exemplary model or mapping herein.

If the vehicle 100 is in a steady-state condition, at block 230, the computer 105 may receive torque demand data, such as information from sensors 110, such as, for example, data from a torque sensor, or may receive a torque demand estimate based on other sensors 110. Next, at a block 235, the computer 105 compares the torque demand data collected to stored torque requirements among parameters 116. Next, at block 240, the computer 105 may calculate an effective road grade according to the comparison of the measured or estimated torque demand data saved as or derived from collected data 115 and the stored torque requirements among parameters 116. Next, at a block, 245, the computer 105 may update the one or more road grade characteristic model coefficients, or modeling variables, based on the calculated effective grade, such as set forth in the exemplary implementation herein.

Next, with the updated one or more modeling variables (i.e. road grade characteristic model coefficients) from block 245, or having suspended the update of the road grade characteristic model coefficients at block 225, the road grade characteristic is updated at a block 250. After the calculation of the road grade characteristic at the block 250, the computer 105 determines whether it is to continue updating the road grade characteristic at the block 260. If so, e.g. the vehicle 100 is continuing to operate in cruise-control mode, the process 200 returns to block 205. If not, e.g. the vehicle 100 has reached its destination, the process 200 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising a computer in a vehicle, the computer comprising a processor and a memory, wherein the computer is configured to:
    determine an operational state of a vehicle;
    calculate a road grade value from data from an accelerometer;
    calculate an effective grade value from a torque demand value;
    determine a correction coefficient to adjust the road grade value to substantially match the effective grade value when the operation state is determined to be a steady-state condition;
    determine a corrected effective grade based at least in part on the correction coefficient and the road grade value; and
    adjust a velocity of the vehicle with a cruise control system based at least in part on the corrected effective grade when the operation state is a transient condition;
    wherein the correction coefficient is based at least in part on the road grade value and the effective grade value.

2. The vehicle system of claim 1, wherein the computer is further configured to estimate the torque demand value from collected data.

3. The vehicle system of claim 2, wherein the collected data includes at least one of vehicle speed data, requested torque data, and vehicle acceleration data.

4. The vehicle system of claim 1, wherein the road grade value is calculated from data from the accelerometer and a vehicle speed sensor.

5. The vehicle system of claim 1, wherein the correction coefficient is determined with a least-squares calculation.

6. A method comprising:
    determining an operational state of a vehicle;
    calculating a road grade value from data from an accelerometer;
    calculating an effective grade value from a torque demand value;
    determining a correction coefficient to adjust the road grade value to substantially match the effective grade value when the operation state is determined to be a steady-state condition,
    determining a corrected effective grade based at least in part on the correction coefficient and the road grade value; and
    adjusting a velocity of the vehicle with a cruise control system based at least in part on the corrected effective grade when the operation state is a transient condition;
    wherein the correction coefficient is based at least in part on the road grade value and the effective grade value.

7. The method of claim 6, further comprising estimating the torque demand value from collected data.

8. The method of claim 7, wherein the collected data includes at least one of vehicle speed data, requested torque data, and vehicle acceleration data.

9. The method of claim 6, wherein the road grade value is calculated from data from the accelerometer and a vehicle speed sensor.

10. The method of claim 6, where the correction coefficient is determined with a least-squares calculation.

11. A non-transitory computer-readable medium tangibly embodying computer-executable instructions that cause a processor to execute operations comprising:
    determining an operational state of a vehicle;
    calculating a road grade value from data from an accelerometer;
    calculating an effective grade value from a torque demand value;
    determining a correction coefficient to adjust the road grade value to substantially match the effective grade value when the operation state is determined to be a steady-state condition,
    determining a corrected effective grade based at least in part on the correction coefficient and the road grade value; and
    adjusting a velocity of the vehicle with a cruise control system based at least in part on the corrected effective grade when the operation state is a transient condition;
    wherein the correction coefficient is based at least in part on the road grade value and the effective grade value.

12. The non-transitory computer-readable medium of claim 11, the operations further comprising estimating the torque demand value from collected data.

13. The non-transitory computer-readable medium of claim 12, wherein the collected data includes at least one of vehicle speed data, requested torque data, and vehicle acceleration data.

14. The non-transitory computer-readable medium of claim 11, wherein the road grade value is calculated from data from the accelerometer and a vehicle speed sensor.

15. The non-transitory computer-readable medium of claim 11, wherein the correction coefficient is determined with a least-squares calculation.

* * * * *